UNITED STATES PATENT OFFICE.

WILLIAM T. RICKARD, OF NEW MONITOR, CALIFORNIA.

IMPROVEMENT IN COMPOUNDS FOR PREVENTING INCRUSTATIONS IN STEAM-BOILERS.

Specification forming part of Letters Patent No. 117,462, dated July 25, 1871.

*To all whom it may concern:*

Be it known that I, WILLIAM T. RICKARD, of New Monitor, Alpine county, State of California, have invented or discovered an Improved Compound of Substances for the Prevention and Removal of Incrustation in Steam-Boilers; and I do hereby declare the following to be a full, clear, and exact description of said compound, giving the names of the ingredients and quantities of each to be used, together with a full explanation of the manner of preparing and using the said compound, given in language which will be sufficiently understood by others desiring to make and use the same.

The nature of my invention is the use and employment of nitrogenized animal substances, acted upon chemically by mineral or other acids for the production of a substance possessing the properties requisite for the prevention of incrustation in steam-boilers by the deposition of calcareous or other matter held in solution by the water employed for the generation of steam.

In order to accomplish the above object I take a given quantity of nitrogenized animal matter, such as muscular fiber, gelatinized matter, as hair, horn, skin, tanned or untanned, or other animal matter, and introduce it into a vessel with as much water as will cover it, and after applying heat sufficient to bring it into a state of ebullition, I introduce from ten to twenty per cent. of the weight of the animal matter, more or less, of mineral acids, such as nitric, sulphuric, or hydrochloric acids, and boil the mixture until it assumes a gelatinous and homogeneous appearance, when I remove it from the acid liquid and wash it repeatedly in clean hot water to remove the acid, after which I press it into boxes or other packages, in which it hardens and becomes ready for use.

This substance, when introduced into steam-boilers in the proportion of one pound weight to each horse-power of the boiler, becomes semi-liquefied as a gelatinous substance, which, being heavier than water, sinks to the lower part of the boiler, where it remains and forms a stratum between the iron and the precipitated matter resulting from the continued evaporation of the water supplied to the boiler, thereby preventing such precipitated matter attaching itself to the iron and causing ordinary incrustation. It not only prevents incrustation but removes former incrustations.

In practice, for its preparation, I prefer using leather and sulphuric acid in proportions and with the manipulations as above given.

The tubes are to be cleaned out at the usual periods by means of a brush, as no incrustation can take place when this substance is used, the deposit being removed in the condition of soft mud.

Having thus described my invention, what I claim, and desire to secure by Letters Patent, is—

An anti-incrustator for steam-boilers, prepared from the ingredients specified, in about the manner and proportions above given.

In witness that the above-described invention is claimed by me I have hereunto set my hand and seal.

WILLIAM T. RICKARD. [L. S.]

Witnesses:
J. A. JOHNSON,
JAMES BENNETT.